US010371218B2

(12) United States Patent
Kim et al.

(10) Patent No.: US 10,371,218 B2
(45) Date of Patent: Aug. 6, 2019

(54) ELECTROMAGNETIC BRAKE SYSTEM FOR TRANSMISSION

(71) Applicant: Hyundai Motor Company, Seoul (KR)

(72) Inventors: Baekyu Kim, Suwon-si (KR); Seok Joon Kim, Yongin-si (KR); Junyoung Ha, Ulsan (KR); Chulmin Ahn, Busan (KR); SungGon Byun, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 253 days.

(21) Appl. No.: 15/373,339

(22) Filed: Dec. 8, 2016

(65) Prior Publication Data
US 2018/0119759 A1    May 3, 2018

(30) Foreign Application Priority Data

Nov. 1, 2016    (KR) .......................... 10-2016-0144492

(51) Int. Cl.
*F16H 3/72* (2006.01)
*F16D 63/00* (2006.01)
*B60K 6/365* (2007.10)
B60K 6/44 (2007.10)
F16H 3/54 (2006.01)

(52) U.S. Cl.
CPC ............ *F16D 63/002* (2013.01); *B60K 6/365* (2013.01); *F16H 3/725* (2013.01); *F16H 3/727* (2013.01); B60K 6/44 (2013.01); B60Y 2200/92 (2013.01); B60Y 2400/423 (2013.01); B60Y 2400/73 (2013.01); F16H 3/54 (2013.01); F16H 2200/2005 (2013.01); F16H 2200/2033 (2013.01); F16H 2200/2035 (2013.01); F16H 2200/2066 (2013.01); F16H 2200/2082 (2013.01); Y10S 903/91 (2013.01)

(58) Field of Classification Search
CPC ..................................................... F16D 27/115
See application file for complete search history.

(56) References Cited

U.S. PATENT DOCUMENTS

| | | | | |
|---|---|---|---|---|
| 3,548,985 A | * | 12/1970 | Rothfuss | F16D 27/112 |
| | | | | 192/107 M |
| 2003/0103850 A1 | * | 6/2003 | Szulczewski | B60K 6/12 |
| | | | | 417/319 |
| 2016/0010700 A1 | * | 1/2016 | Funato | F16D 11/14 |
| | | | | 74/661 |

FOREIGN PATENT DOCUMENTS

| | | |
|---|---|---|
| KR | 20010095099 A | 11/2001 |
| KR | 20100136957 A | 12/2010 |

* cited by examiner

*Primary Examiner* — Derek D Knight
(74) *Attorney, Agent, or Firm* — Slater Matsil, LLP

(57) ABSTRACT

An electronic brake system includes an electromagnet housing in which an inner disk install end is integrally formed around the inside surface. An electromagnet is disposed inside of the electromagnet housing. A motor plate is installed at a motor/generator, and in which an outer disk install end disposed outside of the inner disk install end in a radial direction is integrally formed around one side surface. A disk unit is provided in which a plurality of the inner disks and the outer disks are overlapped between the inner disk install end and the outer disk install end to be combined each other through friction by virtual pressure. A piston is disposed according to the inside surface of the electromagnet housing, connected with a plunger being introduced along the support end of the rear cover, and operated by electromagnetic force of the electromagnet to supply virtual pressure to the disk unit.

19 Claims, 4 Drawing Sheets

ELECTROMAGNETIC BRAKE SYSTEM FOR TRANSMISSION

CROSS-REFERENCE TO RELATED APPLICATIONS

This application claims priority to and the benefit of Korean Patent Application No. 10-2016-0144492 filed in the Korean Intellectual Property Office on Nov. 1, 2016, the entire contents of which are incorporated herein by reference.

TECHNICAL FIELD

The present invention relates to an electronic brake system for a transmission.

BACKGROUND

Environmental friendly technology in a vehicle is core technology for survival of a future automobile industry and automakers devote all their energy to developing an environmental friendly automobile for getting over environmental and fuel efficiency regulations.

Examples of future automobile technologies may include an electric vehicle (EV) using electric energy, a hybrid electric vehicle (HEV), and a double clutch transmission (DCT) of which efficiency and convenience are improved.

Particularly, the hybrid electric vehicle using two or more power sources may have various types of combinations, and in general, a hybrid of a gasoline engine or a diesel engine using existing fossil fuel and a motor/generator driven by the electric energy is provided.

The hybrid electric vehicle generally uses an engine and a motor/generator, and uses the motor/generator having a relatively better low-speed torque characteristic as a main power source in a low speed and uses the engine having a relatively better high-speed torque characteristic as the main power source in a high speed.

Therefore, since the hybrid electric vehicle stops an operation of the engine using fossil fuel and uses the motor/generator in a low-speed section, the hybrid electric vehicle has an excellent effect in improvement of fuel efficiency and reduction of exhaust gas.

Further, a transmission system for the hybrid electric vehicle as described above is classified into a single mode type and a multi-mode type.

The single mode type may not require connection units, such as a clutch and a brake for transmission control, but may have the reduced fuel efficiency at the time of high-speed driving and require an additional torque multiplication apparatus so as to apply to a large vehicle.

The multi-mode type may have increased efficiency at the time of high-speed driving and may be designed to enable torque multiplication, thereby being applied to a medium-large size vehicle.

Recently, the multi-mode type is mainly used rather than using the single mode type. Therefore, a research for the multi-mode type has been actively conducted.

The transmission system in the multi-mode type is configured to include a planetary gear set, a plurality of motors/generators which are used as a motor and a generator, a torque delivery device which controls rotating elements of the planetary gear set, a battery which is used as a power source for the motor/generator, and the like.

The transmission system in the multi-mode type has different operation mechanisms depending on a connection configuration of the planetary gear set, the motor/generator, and the torque delivery device. Further, since the transmission system in the multi-mode type has characteristics of which durability, power transmission efficiency, a size, and the like vary depending on the connection configuration, a research and development for implementing a power transmission mechanism which is more robust, reduces power loss, and is compact in a field of the transmission system for a hybrid electric vehicle has continued.

In this view, the brake device of hydraulic pressure operating type applied to the transmission for a hybrid electric vehicle as a friction element has to be provided with complex operation mechanism such as an electronic oil pump (EOP) and a valve body and control process so that power is lost and fuel efficiency is deteriorated by weight and size increase.

The above information disclosed in this Background section is only for enhancement of understanding of the background of the invention and therefore it may contain information that does not form the prior art that is already known in this country to a person of ordinary skill in the art.

SUMMARY

The present invention relates to an electronic brake system for a transmission and, in particular embodiments, to an electronic brake system for a transmission capable of reducing components and weight by operating a brake of the transmission of a hybrid electric vehicle by using an electromagnet.

An exemplary embodiment of the present invention has been an effort to provide an electronic brake system for a transmission capable of reducing components and weight and enhancing fuel efficiency by operating a brake for controlling power of a motor/generator inside of the transmission by using an electromagnet fixed at a side of a rear cover of the transmission.

An exemplary embodiment of the present invention provides an electronic brake system for a transmission for controlling power of a motor/generator in the transmission including a plurality of motor/generators and planet gear sets. An electromagnet housing is fixed by being inserted into a support end formed at an inside surface of a rear cover of the transmission, and in which an inner disk install end is integrally formed around the inside surface. An electromagnet is disposed inside of the electromagnet housing. A motor plate is installed at the one of the motor/generators, and in which an outer disk install end disposed outside of the inner disk install end in a radial direction is integrally formed around one side surface. A disk unit is provided in which a plurality of the inner disks and the outer disks are overlapped between the inner disk install end and the outer disk install end to be combined each other through friction by virtual pressure. A piston is disposed according to the inside surface of the electromagnet housing, connected with a plunger being introduced along the support end of the rear cover, and operating by electromagnetic force of the electromagnet to supply virtual pressure to the disk unit.

Also, an electromagnet cover may be integrally disposed at the outside of the electromagnet housing.

Also, the electromagnet housing may be engaged to the inside surface of the rear cover by a plurality of engagement bolts.

Also, a plurality of oil holes may be formed on and around the support end of the rear cover.

Also, the disk unit may include an inner disk inserted in an outer diameter portion of the inner disk install end, a plurality of outer disks disposed at both sides of the inner disk and inserted in an inner diameter portion of the outer disk install end, and a reaction disk inserted in the outer diameter portion of the inner disk install end between an inside outer disk of the plurality of the outer disks and the piston.

Also, a plurality of return springs may be interposed between the reaction disk and the inside surface of the electromagnet housing.

Also, a snap ring defining stroke of the piston which is integrally formed with the plunger may be installed around inside tip end of the support end of the rear cover.

Also, the piston may include a plurality of oil holes penetrating in a vertical direction along circumference according to the inner diameter portion of the inner disk install end.

In an exemplary embodiment of the present invention, a brake for controlling power of the motor/generator inside of the transmission is operated by electromagnetic force of the electromagnet fixed at a side of the rear cover of the transmission to simplify brake system, and responsibility may be enhanced and fuel efficiency may be improved by reducing drag loss.

Also, hydraulic components such as an oil pump, a pump motor and a valve body may be omitted so that components and weight may be reduced and packaging may be advantageous.

Also, friction member such as the inner disk and the outer disk may be effectively cooled down by using and introducing shaft lubrication oil.

Figure 1:
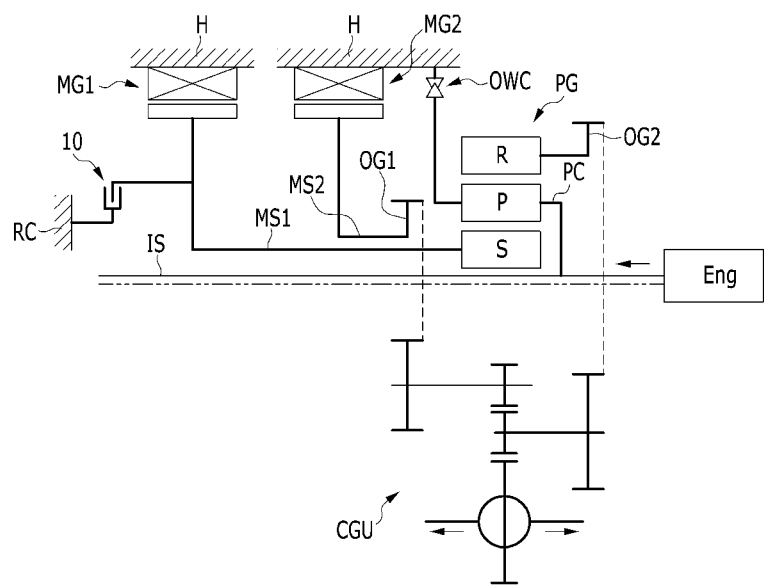
FIG. 1 is a schematic diagram of a transmission for a hybrid vehicle in which an electronic brake system according to an exemplary embodiment of the present invention is applied.

The following reference symbols can be used in conjunction with the drawings:
 IS: input shaft
 MS1, MS2: first, second motor shaft
 MG1, MG2: first, second motor/generator
 PG: planetary gear set
 S: sun gear
 PC: planetary carrier
 R: ring gear
 OG1, OG2: first, second output gear
 RC: rear cover
 OWC: one-way clutch
 CGU: reduction gear unit
 10: electronic brake system
 11: electromagnet housing
 13: electromagnet
 15: motor plate
 19: electromagnet cover
 21; support end
 23: inner disk install end
 25: outer disk install end
 30: disk unit
 31: inner disk
 33: outer disk
 35: reaction disk
 41: piston
 43: plunger
 45: snap ring
 B: engagement bolt
 H1, H2: oil hole

DETAILED DESCRIPTION OF ILLUSTRATIVE EMBODIMENTS

Hereinafter, exemplary embodiments of the present invention will be described in detail with reference to the accompanying drawings.

Accordingly, the drawings and description are to be regarded as illustrative in nature and not restrictive. Like reference numerals designate like elements throughout the specification.

In the following description, the same components are classified into first, second, and the like to differentiate names for components and a sequence thereof is not necessarily limited thereto.

FIG. 1 is a schematic diagram of a transmission for a hybrid vehicle in which an electronic brake system according to an exemplary embodiment of the present invention is applied.

Referring to FIG. 1, firstly, a transmission for a hybrid vehicle in which an electronic brake system according to an exemplary embodiment of the present invention transfers power of an engine Eng which is a power source, a first and second motor/generators MG1 and MG2 according to vehicle driving state to output power through a first and second output gears OG1 and OG2.

That is, the transmission includes the first and second motor/generators MG1 and MG2, a planetary gear set PG, the first and second output gears OG1 and OG2, a one-way clutch OWC which is rotation defining member, reduction gear unit CGU and the electronic brake system 10 according to an exemplary embodiment of the present invention.

The first motor/generator MG1 and the second motor/generator MG2 are independent power sources respectively, have function of motor and generator simultaneously.

The first motor/generator MG1 may be connected with a sun gear S of the planetary gear set PG through a first motor shaft MS1 to operate as a motor supplying rotational power through a second output gear OG2 connected with a ring gear R.

The second motor/generator MG2 may be connected with a first output gear OG1 through a second motor shaft MS2 to operate as a motor supplying rotational power.

For this purpose, in the first motor/generator MG1 and second motor/generator MG2, each stator is fixed at the transmission housing H and connected with the sun gear S of the planetary gear set PG and the first output gear OG1, respectively.

The first, second motor/generators MG1 and MG2 and planetary gear set PG configured as described above are disposed on the input shaft IS.

At this time, the first output gear OG1 operates as an output gear in which output of the second motor/generator MG2 is conducted, and the second output gear OG2 operates as an output gear in which the engine Eng and the first motor/generator MG1 is conducted.

As the rotation defining member, the one-way clutch OWC is applied in an exemplary embodiment of the present invention, however, it is not limited to this, and the rotation defining member may be a two-way clutch or a brake.

Further, an electronic brake system 10 according to an exemplary embodiment of the present invention is a brake system for over drive to control power of the first motor/generator MG1 inside of the transmission and is an electronic brake operating by using an electromagnet 13 fixed at a side of the rear cover RC of the transmission.

Hereinafter, this electronic brake system 10 will be described in more detail.

Figure 2:
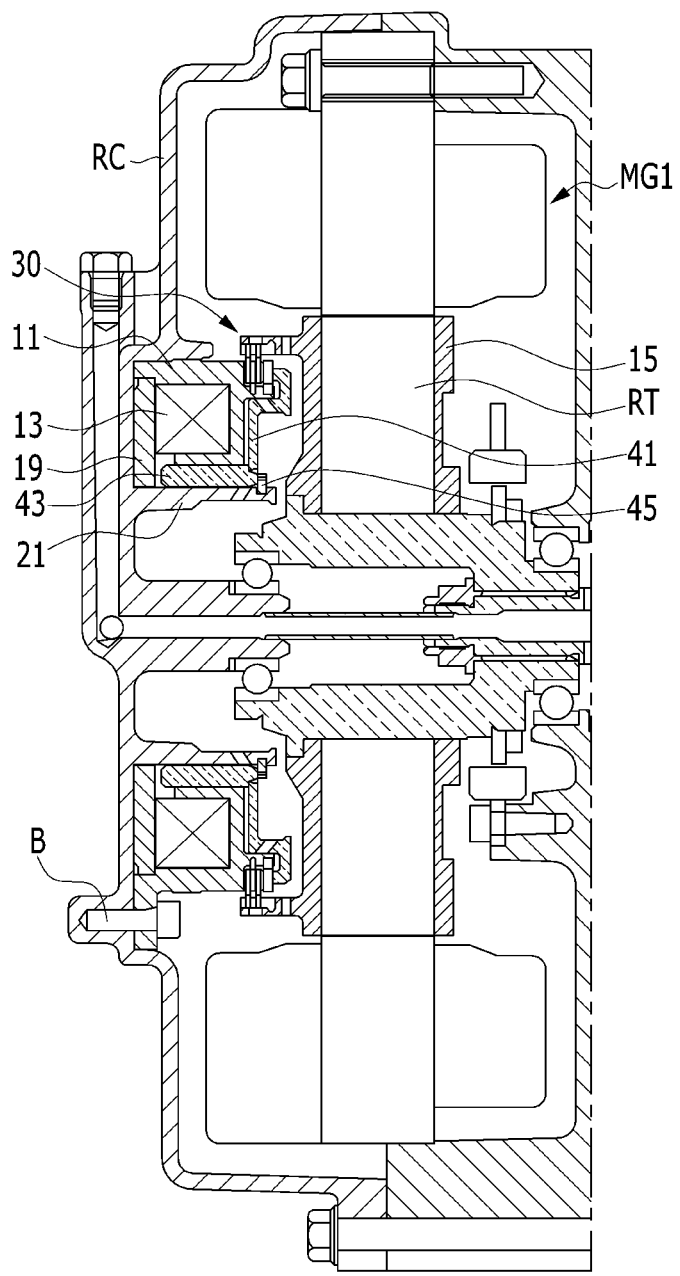
FIG. 2 is an exploded cross-sectional view of an electronic brake system according to an exemplary embodiment of the present invention.
Figure 3:
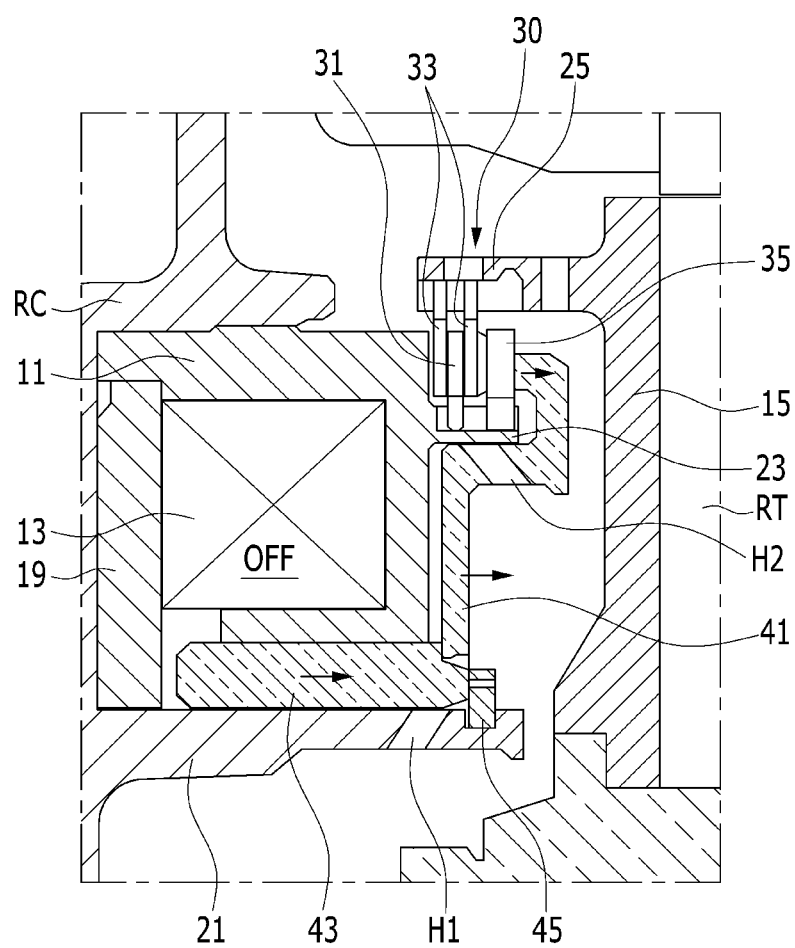
FIG. 3 is an enlarged cross-sectional view of 'A' portion of FIG. 2.
Figure 4:
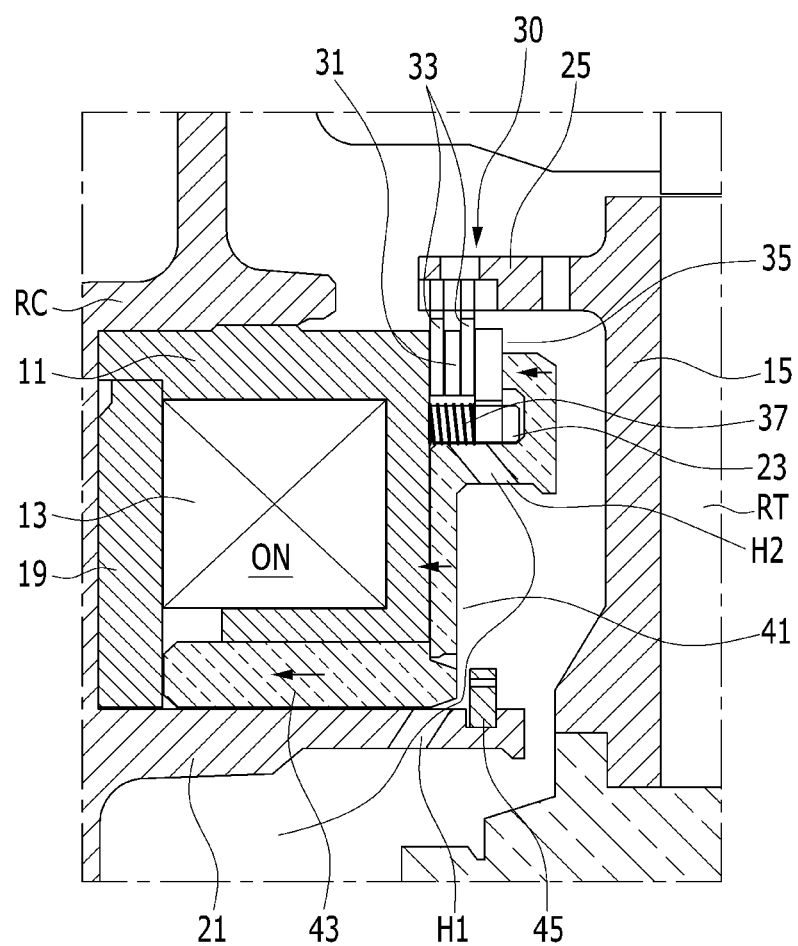
FIG. 4 is an enlarged cross-sectional view of 'B' portion of FIG. 2.

FIG. 2 is an exploded cross-sectional view of an electronic brake system according to an exemplary embodiment of the present invention, and FIG. 3 and FIG. 4 are enlarged cross-sectional views of 'A' portion and 'B' portion of FIG. 2, respectively.

Referring to FIG. 2, FIG. 3 and FIG. 4, an electronic brake system according to an exemplary embodiment of the present invention includes an electromagnet housing 11, an electromagnet 13, a motor plate 15, a disk unit 30 and a piston 41.

Firstly, the electromagnet housing 11 is fixed by being inserted into outside of a support end 21 formed at inside surface of a rear cover RC of the transmission toward inside of the transmission.

In the electromagnet housing 11, an inner disk install end 23 is integrally formed around the inside surface, and an electromagnet cover 19 is integrally fixed at an outside of the electromagnet housing 11 to form space for accommodating the electromagnet inside.

At this time, the electromagnet housing 11 is engaged to the inside surface of the rear cover RC by a plurality of engagement bolts B. In FIG. 2, only one engagement bolt B is illustrated, it is ideal that three engagement bolts is applied along circumference of the cylindrical electromagnet housing 11.

Further, the electromagnet 13 is accommodated in the inner space of the electromagnet housing 11 formed by the electromagnet housing 11 and the electromagnet cover 19.

Here, it is not necessary that direction of electromagnetic force is changed by changing polarity of the electromagnet 13, and the electromagnetic force may act to one direction or be released by power supply control.

The motor plate 15 is installed at a rotor RT of the first motor/generator MG1, and the outer disk install end 25 is disposed outside of the inner disk install end 23 in a radial direction is integrally formed around one side surface.

Further, the disk unit 30 is configured such that a plurality of the inner disks 31 and the outer disks 33 are overlapped between the inner disk install end 23 and the outer disk install end 25 to be combined each other through friction by virtual pressure.

That is, the disk unit 30 is configured such that the inner disk 31 is inserted in an outer diameter portion of the inner disk install end 23, and the inner disk 31 may be one sheet or a plurality of sheets.

At this time, the inner disk 31 may move in a direction that the inner disk 31 is inserted into the inner disk install end 23, but is fixedly installed in a rotational direction to the inner disk install end 23.

Also, the disk unit 30 is configured such that the outer disk 33 is inserted in an outer diameter portion of the outer disk install end 25, and the outer disk 33 may be one sheet or a plurality of sheets.

At this time, the outer disk 33 may move in a direction that the outer disk 33 is inserted into the outer disk install end 25, but is fixedly installed in a rotational direction to the outer disk install end 25, and disposed at both sides of the inner disk 31.

Further, the disk unit 30 is configured such that a reaction disk 35 is inserted in the outer diameter portion of the inner disk install end 23 corresponding to the inside outer disk 33 of the plurality of the outer disks 33 through the inner diameter portion.

At this time, referring to FIG. 4, the reaction disk 35 is configured to be provided with returning force by a plurality of return springs 37 interposed between the reaction disk 35 and the inside surface of the electromagnet housing 11 so that engagement state between the inner disk 31 and the outer disk 33 is rapidly released to minimize drag loss of the friction member.

Further, the piston 41 is disposed according to the inside surface of the electromagnet housing 11 and connected with a plunger 43 being introduced along the support end 21 formed on the rear cover RC.

This piston 41 is formed along inside surface of the electromagnet housing 11 and upper end of the piston 41 is bent toward outside to be contacted with the reaction disk 35, and moves to be contacted with the inside surface of the electromagnet housing 11 by being pulled through electromagnetic force of the electromagnet 13 to provide virtual pressure to the reaction disk 35.

Also, a snap ring 45 defining stroke of the piston 41 which is integrally formed with the plunger 43 is installed around inside tip end of the support end 21 of the rear cover RC, and the snap ring 45 is installed to define moving of the plunger 43 to define stroke of the piston 41 while the snap ring 45 is installed around inside tip end of the support end 21 according to the inside tip end of the plunger 43.

Further, a plurality of oil holes are formed on and around the support end 21 of the rear cover RC, and the oil holes H1 on the support end 21 are formed in an inclined direction to face the snap ring 45 neighboring the snap ring 45 in the range of stroke of the plunger 43.

Also, the piston 41 includes a plurality of oil holes H2 penetrating slantly in a vertical direction along circumference according to the inner diameter portion of the inner disk install end 23.

Thus, when the piston 41 operates toward the electromagnet housing 11 13 by electromagnetic force of the electromagnet 13, the oil hole H1 on the support end 21 is opened and connects space of the input shaft IS located at an inside center portion of the transmission with space between the piston 41 and the motor plate 15 so that shaft lubricant oil is supplied to cooling oil of the inner disk 31 of the disk unit 30 and the outer disk 33 through the oil hole H1 on the support end 21 and the oil hole H2 on the piston 41.

Accordingly, the electronic brake system 10 having the described structure generates electromagnetic force through power control to the electromagnet 13 in the state of FIG. 3, and the piston 41 operates to be pulled toward inside surface of the electromagnet housing 11 to supply virtual pressure to the reaction disk 35.

Then, as shown in FIG. 4, the reaction disk 35 compresses the return spring 37 to press the plurality of the outer disks 33 and inner disks 31 toward inside surface to combine each other through friction, accordingly, fixes the motor plate 15 connected with the rotor RT of the first motor/generator MG1 to the rear cover RC through the electromagnet housing 11.

At this time, shaft lubricant oil is supplied to the inner disk 31 and the outer disk 33 through the oil hole H1 on the support end 21 and the oil hole H2 on the piston to cool the friction member.

Meanwhile, when the electronic brake system 10 releases generation of electromagnetic force through power control of the electromagnet 13 in the state of FIG. 4, the piston 41 moved to be forced out from the inside surface of the electromagnet housing 11 by the return spring 37 to release virtual pressure supplied to the reaction disk 35.

Then, as shown in FIG. 3, combined state each other through friction between the plurality of the outer disks 33 and the inner disks 31 is released so that the rotor RT of the first motor/generator is freely rotatable.

At this time, movement of the plunger 43 is limited by the snap ring 45 to maintain gap between the piston 41 and the inside surface of the electromagnet housing 11, and the oil hole H1 on the support end 21 is blocked to prevent the shaft lubricant oil from being leaked.

Like this, the electronic brake system 10 according to an exemplary embodiment of the present invention is operated by using the electromagnet 13 fixed at the side of the rear cover RC of the transmission to control power of the motor/generator in the transmission to simplify operation mechanism of the brake system compared with conventional hydraulic brake system, and responsibility may be enhanced and fuel efficiency may be improved by reducing drag loss.

Also, hydraulic components such as an oil pump, a pump motor and a valve body applied in the conventional hydraulic brake system may be omitted so that components and weight may be reduced and packaging may be advantageous.

Also, friction member such as the inner disk 31 and the outer disk 33 may be effectively cooled down by introducing shaft lubrication oil.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electronic brake system for a transmission, the electronic brake system comprising:
   an electromagnet housing to be fixed to a support end formed at an inside surface of a rear cover of the transmission, an inner disk install end being integrally formed around an inner surface of the electromagnet housing;
   an electromagnet disposed inside of the electromagnet housing;
   a motor plate installed at a motor/generator, an outer disk install end being disposed in the motor plate outside of the inner disk install end in a radial direction and integrally formed around one side surface;
   a disk unit in which a plurality of inner disks and outer disks are overlapped between the inner disk install end and the outer disk install end and to be combined together through friction by a pressing force; and
   a piston disposed according to an inside surface of the electromagnet housing, connected with a plunger that is introduced along the support end of the rear cover, and configured to operate by electromagnetic force of the electromagnet to supply the pressing force to the disk unit.

2. The electronic brake system of claim 1, wherein the electronic brake system is configured for a transmission for controlling power of a motor/generator in the transmission, the transmission including a plurality of motor/generators and a planetary gear set.

3. The electronic brake system of claim 1, further comprising an electromagnet cover integrally disposed outside of the electromagnet housing.

4. The electronic brake system of claim 1, further comprising a plurality of engagement bolts to attach the electromagnet housing to the inside surface of the rear cover.

5. The electronic brake system of claim 1, wherein a plurality of oil holes are formed on and around the support end of the rear cover.

6. The electronic brake system of claim 1, wherein the disk unit comprises:
   an inner disk inserted in an outer diameter portion of the inner disk install end;
   a plurality of outer disks disposed at both sides of the inner disk and inserted in an inner diameter portion of the outer disk install end; and
   a reaction disk inserted in the outer diameter portion of the inner disk install end between an inside outer disk of the plurality of the outer disks and the piston.

7. The electronic brake system of claim 6, further comprising a plurality of return springs interposed between the reaction disk and the inside surface of the electromagnet housing.

8. The electronic brake system of claim 1, further comprising a snap ring defining stroke of the piston integrally formed with the plunger and to be installed around inside tip end of the support end of the rear cover.

9. The electronic brake system of claim 1, wherein the piston includes a plurality of oil holes penetrating in a vertical direction along circumference according to an inner diameter portion of the inner disk install end.

10. A vehicle comprising:
    a transmission including a rear cover, a plurality of motor/generators and a planetary gear set;
    an electromagnet housing fixed to a support end formed at an inside surface of the rear cover of the transmission, an inner disk install end being integrally formed around an inner surface of the electromagnet housing;
    an electromagnet disposed inside of the electromagnet housing;
    a motor plate installed at the motor/generator of the transmission, an outer disk install end being disposed in the motor plate outside of the inner disk install end in a radial direction and integrally formed around one side surface;
    a disk unit in which a plurality of the inner disks and the outer disks are overlapped between the inner disk install end and the outer disk install end and to be combined together through friction by a pressing force; and
    a piston disposed according to an inside surface of the electromagnet housing, connected with a plunger that is introduced along a support end of the rear cover, and configured to operate by electromagnetic force of the electromagnet to supply the pressing force to the disk unit.

11. The vehicle of claim 10, further comprising an electromagnet cover integrally disposed outside of the electromagnet housing.

12. The vehicle of claim 10, wherein the electromagnet housing is engaged to the inside surface of the rear cover by a plurality of engagement bolts.

13. The vehicle of claim 10, wherein a plurality of oil holes are formed on and around the support end of the rear cover.

14. The vehicle of claim 10, wherein the disk unit comprises:

an inner disk inserted in an outer diameter portion of the inner disk install end;
a plurality of outer disks disposed at both sides of the inner disk and inserted in an inner diameter portion of the outer disk install end; and
a reaction disk inserted in the outer diameter portion of the inner disk install end between an inside outer disk of the plurality of the outer disks and the piston.

15. The vehicle of claim 14, further comprising a plurality of return springs interposed between the reaction disk and the inside surface of the electromagnet housing.

16. The vehicle of claim 10, further comprising a snap ring defining stroke of the piston integrally formed with the plunger and installed around inside tip end of the support end of the rear cover.

17. The vehicle of claim 10, wherein the piston includes a plurality of oil holes penetrating in a vertical direction along circumference according to an inner diameter portion of the inner disk install end.

18. The electronic brake system of claim 1, wherein the electromagnet housing is fixed to a support end formed at an inside surface of a rear cover of the transmission.

19. A vehicle comprising:
the electronic brake system of claim 1; and
a transmission having a rear cover, wherein the electromagnet housing is fixed to a support end formed at an inside surface of the rear cover of the transmission.

* * * * *